US011870857B1

United States Patent
Padmanabhan et al.

(10) Patent No.: US 11,870,857 B1
(45) Date of Patent: Jan. 9, 2024

(54) USER ACCOUNT MIGRATION BETWEEN PLATFORMS

(71) Applicant: Amazon Technologies, Inc., Seattle, WA (US)

(72) Inventors: Neeresh Padmanabhan, Seattle, WA (US); Aparajita Bal, Kirkland, WA (US); Prakash Gupta, Up (IN)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/528,228

(22) Filed: Jul. 31, 2019

(51) Int. Cl.
*H04L 67/306* (2022.01)
*G06Q 40/02* (2023.01)
*G06Q 20/22* (2012.01)

(52) U.S. Cl.
CPC ......... *H04L 67/306* (2013.01); *G06Q 20/227* (2013.01); *G06Q 40/02* (2013.01)

(58) Field of Classification Search
CPC ..... H04L 67/306; G06Q 20/227; G06Q 40/02
USPC .......................................................... 705/41
See application file for complete search history.

(56) References Cited

U.S. PATENT DOCUMENTS

| | | | | |
|---|---|---|---|---|
| 2013/0238786 A1* | 9/2013 | Khesin | ................. | H04L 67/025 709/224 |
| 2015/0215261 A1* | 7/2015 | Zhang | .................... | G06Q 10/10 709/206 |
| 2016/0219027 A1* | 7/2016 | Kaplan | ................. | H04W 12/06 |
| 2016/0307145 A1* | 10/2016 | Banerjee | ........ | G06Q 10/063118 |
| 2018/0212981 A1* | 7/2018 | Little | ................... | H04W 12/37 |
| 2018/0239500 A1* | 8/2018 | Allen | .................... | G06F 3/0488 |

* cited by examiner

*Primary Examiner* — Jessica Lemieux
*Assistant Examiner* — Merritt J Hasbrouck
(74) *Attorney, Agent, or Firm* — Thomas | Horstemeyer, LLP

(57) ABSTRACT

Disclosed are various embodiments for performing user account migration between platforms. In one embodiment, a client device is configured to obtain an update to a first application. The update causes the client device to obtain a second application. A first user account on a first platform associated with the first application is migrated to a second user account on a second platform associated with the second application. The client device launches the second application for access to the second user account after the first application is launched.

18 Claims, 8 Drawing Sheets

USER ACCOUNT MIGRATION BETWEEN PLATFORMS

BACKGROUND

Individual organizations may have different user accounts and different types of user data associated with those accounts. Over time, organizations may be acquired by other organizations. In some cases, the information technology operations of an acquired organization may continue indefinitely on a separate basis. In other cases, the information technology operations of the acquired organization may be combined with another organization related to the acquirer. In such cases, it may be desirable to transition the user accounts of the acquired organization to become user accounts of the other organization related to the acquirer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
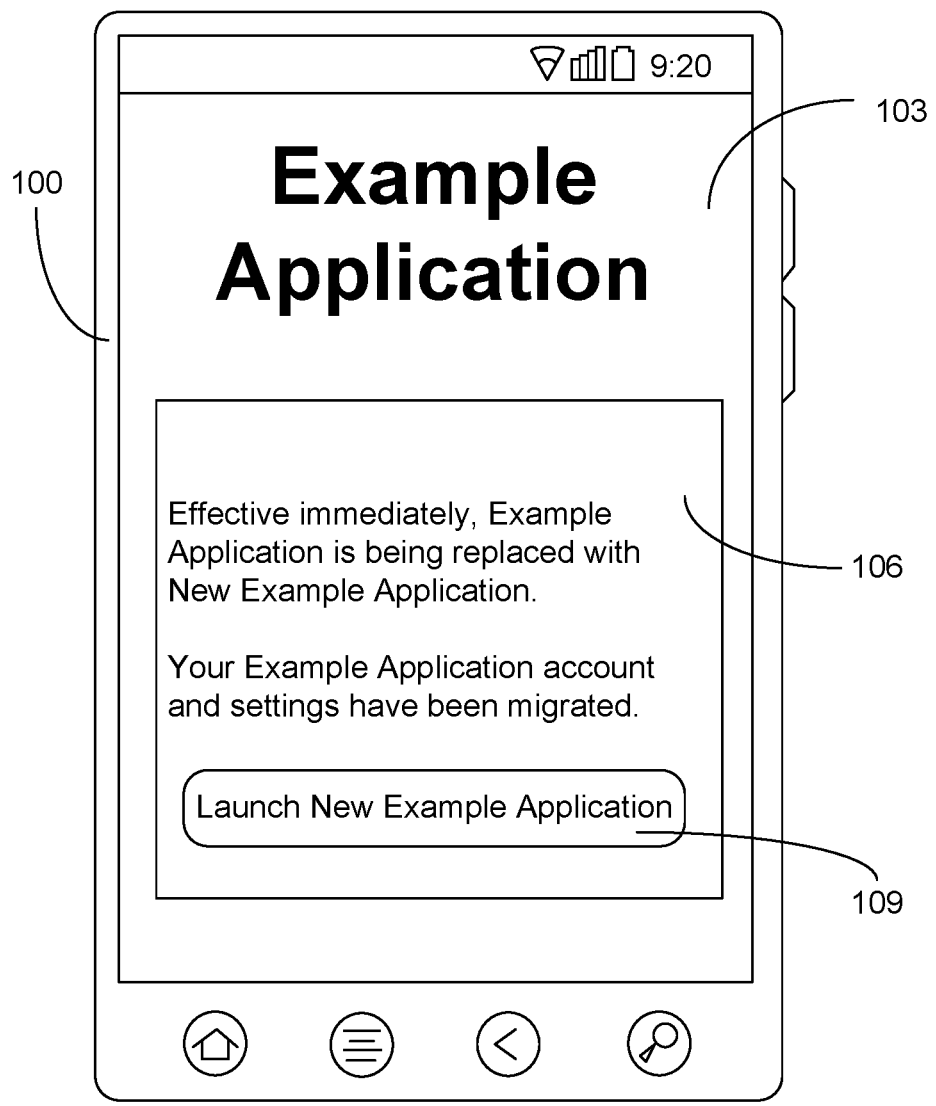
FIG. 1 is a drawing of a client device rendering an example user interface showing a migration from one application to another according to various embodiments of the present disclosure.

The present disclosure relates to on-demand account migration. For a variety of reasons, user accounts may need to be migrated from one platform to another. For example, a first organization may be acquired by a second organization, and the second organization may decide to migrate user accounts of the first organization to become user accounts of the second organization. Alternatively, an organization may decide to discontinue operations of a subsidiary, or merge the operations of two subsidiaries together, which could also necessitate user account migrations. In another example, a first organization shares a feature of their user accounts with a second organization, which involves migrating some user account data from the first organization to the second organization, and where the accounts with the first organization will remain active.

Under some approaches, account migrations may result in poor user experiences. To illustrate, a poor user experience would result if the user were told to create an entirely new account on the new platform and supply all new information to do so. It could also be a poor experience if the discontinued account had extensive historical data, personalizations, and/or other user-supplied information, and if this information were not transferred to the new account. Consequently, it is preferable to employ some type of migration so that information is automatically transferred from the user's previous account to the user's new account.

Nonetheless, an automated migration of all users from one account platform to another account platform may take an excessive amount of time or involve an excessive amount of expense. The processing required to transfer types of data from one platform to another may involve a great deal of computing capacity, especially with very large user bases. Moreover, users may use fewer than all features offered in the first platform, which would potentially result in a waste of computing resources to migrate an unused feature for a user from the first platform to a second platform.

Various embodiments of the present disclosure introduce a system for account migration in which user accounts, or specific features in the user accounts, are migrated from one platform to another platform on-demand and/or based at least in part on predicted use according to the user's profile. Further, where a first application is installed on the users' client devices to access the first platform, a second application to access the second platform can be automatically downloaded to the users' client devices to facilitate the migration, where the first application can be automatically reconfigured to include a link to the second application. As such, in some implementations, users would not be required to locate and download the second application from an application store system.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the migration of unused user accounts or unused features of user accounts until such time that use of those accounts or features is requested; (2) reducing computer resource utilization (e.g., memory consumption, processor utilization, network transfer, etc.) by prioritizing migration of user accounts or specific features of the user accounts that are predicted to be used; (3) improving the user experience in interacting with a computer system by automating the migration from one application to another application; (4) improving the user experience in interacting with a computer system by automating the transfer of user data from one platform to another; and so forth. In the following discussion, a general description of the system and its components is provided, followed by a discussion of the operation of the same.

Referring now to FIG. 1, shown is a drawing of a client device 100 rendering an example user interface 103 showing a migration from one application to another. The user interface 103 corresponds to a legacy application for a legacy platform and is titled "Example Application." Within the user interface 103 is a dialog 106 that notifies the user that "Example Application" is being replaced with "New Example Application." The dialog 106 also informs the user that the "Example Application account and settings have been migrated." The dialog 106 further includes a component 109 that when selected causes the "New Example Application" to be launched in the client device 100. Consequently, through the example illustrated in FIG. 1, the user need not visit an application store to download and install the target application that replaces the legacy application, thereby improving the user experience. The user may be prompted to consent to the installation of the "New Example Application," or the installation may proceed automatically in the background under the auspices of the "Example Application."

Figure 2:
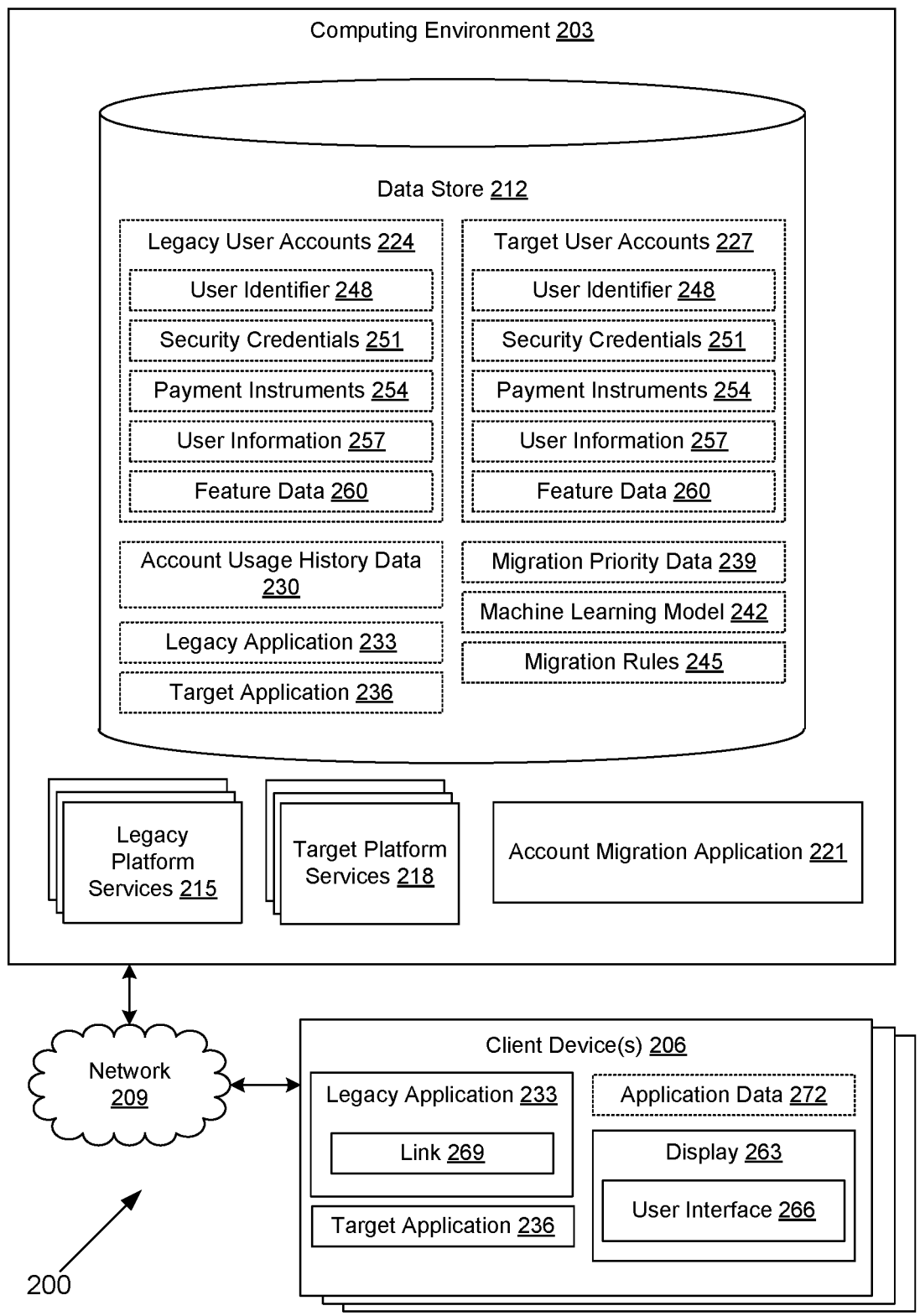
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include legacy platform services 215, target platform services 218, an account migration application 221, and other applications, services, processes, systems, engines, or functionality not discussed in detail herein. The legacy platform services 215 are executed to support functionality associated with a legacy platform that is being supplanted by a target platform. To this end, the legacy platform services 215 may correspond to network page servers, web services, and/or other services that can supply data to legacy applications.

The target platform services 218 are executed to support functionality associated with the target platform that is replacing the legacy platform. To this end, the legacy platform services 215 may correspond to network page servers, web services, and/or other services that can supply data to target applications. In various examples, the legacy platform services 215 and the target platform services 218 may support electronic commerce functionality. In one example, the legacy platform services 215 corresponds to an electronic commerce network site that is being discontinued in favor of another electronic commerce network site corresponding to the target platform services 218.

The account migration application 221 is executed to perform the migration of user accounts from a legacy platform to a target platform. Such a migration may happen all at once and automatically, or the migration may be performed in a priority order or in stages. For example, some user accounts may be migrated before others, and some user data in user accounts may be migrated before other user data for the same user accounts. The migration may also be performed on-demand when a user attempts to access the legacy user account or a feature not yet migrated to a target user account. The account migration application 221 may also supervise the deployment of target applications to replace legacy applications on client devices 206.

In some embodiments, the data stored in the data store 212 includes, for example, legacy user accounts 224, target user accounts 227, account usage history data 230, a legacy application 233, a target application 236, migration priority data 239, a machine learning model 242, migration rules 245, and potentially other data. The legacy user accounts 224 are utilized to access legacy platform services 215 via the legacy application 233. The legacy user accounts 224 may be associated with one or more items of various user data such as a user identifier 248, one or more security credentials 251, one or more payment instruments 254, user information 257, feature data 260, and/or other data.

The user identifier 248 may correspond to a username, account login name, or other identifier that uniquely identifies the user account from among the legacy user accounts 224. For example, the user identifier 248 may be an email address of the user, a phone number of the user, or another identifier that is unique. The security credentials 251 are used to authenticate the user for access to the legacy user account 224. To this end, the security credentials 251 may include one or more of passwords, one-time password token information, biometric profile information, numerical codes, answers to knowledge-based questions, symmetric keys, public keys, and/or other credentials. In some cases, the security credentials 251 correspond to identities maintained by a federated identity provider.

The payment instruments 254 may correspond to data describing credit cards, debit cards, gift cards, stored value payment instruments, banking accounts, and/or other mechanisms for effecting a payment. For example, for a credit card, the payment instruments 254 may store a card number, a cardholder name, an expiration date, a verification code, a billing address, and/or other information needed to consummate a payment.

The user information 257 may include one or more of the name of the user, street address, contact information, preferences, personalizations, and/or other information. The feature data 260 corresponds to a plurality of features offered by the legacy platform services 215. The features are customized for the particular user account. For example, for a legacy platform corresponding to an electronic commerce site, the features may include one or more of an order history, a shopping cart, a wish list, item reviews, item ratings, and/or other features. In some embodiments, there is user data associated with each of the features that may be too time consuming or costly to transfer all at once when migrating the account to a target platform. Some users may engage with all features, while other users may engage with fewer features.

The target user accounts 227 correspond to user accounts for accessing the target platform services 218 via the target application 236. Like the legacy user accounts 224, the target user accounts 227 may be associated with various user data such as a user identifier 248, one or more security credentials 251, one or more payment instruments 254, user information 257, feature data 260, and/or other data.

The user identifier 248 may correspond to a username, account login name, or other identifier that uniquely identifies the user account from among the target user accounts 227. For example, the user identifier 248 may be an email address of the user, a phone number of the user, or another identifier that is unique. The security credentials 251 are used to authenticate the user for access to the new target user account 227. To this end, the security credentials 251 may include one or more of passwords, one-time password token information, biometric profile information, numerical codes, answers to knowledge-based questions, symmetric keys, public keys, and/or other credentials. In some cases, the security credentials 251 correspond to identities maintained by a federated identity provider. In various scenarios, the legacy user account 224 and the target user account 227 support different federated identity providers, or in one scenario, a user uses a federated identity provider with a legacy user account 224 that is not supported by the target user account 227. In such a case, a user can be required to establish new security credentials 251 or link to an identity with a supported federated identity provider.

The payment instruments 254 may correspond to data describing one or more of credit cards, debit cards, gift cards, stored value payment instruments, banking accounts, and/or other mechanisms for effecting a payment. For example, for a credit card, the payment instruments 254 may store a card number, a cardholder name, an expiration date, a verification code, a billing address, and/or other information needed to consummate a payment.

The user information 257 may include one or more of the name of the user, street address, contact information, preferences, personalizations, and/or other information. The feature data 260 corresponds to a plurality of features offered by the target platform services 218. The features are customized for the particular user account. For example, for a target platform corresponding to an electronic commerce site, the features may include one or more of an order history, a shopping cart, a wish list, item reviews, item ratings, and/or other features. Some users may engage with all features, while other users may engage with fewer features. It is noted that the target platform may have different features than the legacy platform, which may be fewer features or more features.

The account usage history data 230 tracks the usage of the legacy user accounts 224. For example, the account usage history data 230 may track the last login time for legacy user account 224. Also, the account usage history data 230 may track the last time that individual features were accessed within a legacy user account 224. For example, the account usage history data 230 may indicate that the last login for a legacy user account 224 was one week ago, while the last time the wish list was used was six months ago, and the user has not written any item reviews. The account usage history data 230 can be used to prioritize the migration of legacy user accounts 224 and/or to refrain from automatically migrating certain legacy user accounts 224 or data or features associated with the legacy user accounts 224.

The legacy application 233 may correspond to a client application, a mobile application, a web application, or other type of application that is executed by a client device 206 to access the legacy platform service 215 via a legacy user account 224. The legacy application 233 may be updated with newer versions from time to time, and the client device 206 may have systems configured to receive such updates in an automated way.

The target application 236 may correspond to a client application, a mobile application, a web application, or other type of application that is executed by a client device 206 to access the target platform service 218 via a target user account 227. In some scenarios, the legacy application 233 and the target application 236 have different developer legal entities and consequently are associated with different secure certificates issued by one or more trusted certificate authorities.

In some embodiments, the migration priority data 239 includes data controlling the schedule or priority order for migration of individual legacy user accounts 224 to target user accounts 227. Further, the migration priority data 239 includes data controlling the schedule or priority order for migration of specific data items or feature data 260 from legacy user accounts 224 to target user accounts 227. In some embodiments, the prioritization is based at least in part on past usage recorded in the account usage history data 230 and/or predictions of future usage.

In some embodiments, the machine learning model 242 is trained based at least in part on account usage history data 230 in order to predict which types of legacy user accounts 224 are likely to be used within a time frame, or to predict which types of features from the feature data 260 are likely to be accessed. In other words, actual instances of account use and/or feature use and the intervals of time between such use are determined from the account usage history data 230 in order to create training data.

To illustrate, a first user logs into a legacy user account 224 on approximately a monthly basis and uses a wish list feature. Such a user can be predicted to continue such a routine and the user account should be migrated before the next expected log in. Alternatively, the user account should be migrated, but the migration of the wish list feature can be delayed until the next expected login.

In another example, a second user logs in almost daily, places item orders occasionally, but does not use any specific features. The migration for such a user may be determined to occur as soon as possible to accommodate the next expected log in, but the migration of specific features can be deferred until needed on an on-demand basis.

In yet another example, a third user has not logged in in over six months, despite using many different features. The user is predicted not to log in for another several months. The migration for such as user may be deferred because of the long expected time until the next login.

This information about specific types of users can be used as training data, which is then fed into the machine learning model 242 along with any other characteristics that can be correlated with account and/or feature use. For instance, the characteristics can involve one or more of demographics of the user, order history, computing device platform, geographic location, browse history, and/or other characteristics.

Such characteristics may not appear on their face to be predictive of login behavior or feature use, but, when correlated in an automated manner by a machine learning model 242, can ultimately be data points to both empirically and predictively determine behavior of the same user as well as other users in order to make determinations as whether to migrate or priority order. For example, the machine learning model 242 uses a clustering algorithm to determine clusters of user account characteristics associated with user accounts having different predicted next login times. Such characteristics then can be used by the machine learning model 242 for making predictions in regard to other user accounts.

In some embodiments, data for a subset of the user accounts are employed as training data for the machine learning model 242, and when trained, the machine learning model 242 can be applied to control migrations for different user accounts. In other embodiments, data associated with users that have been subject to a previous migration is used to develop a machine learning model 242 for use in a different migration, for the same users or different users as the case may be.

As a result, the machine learning model 242 is trained to predict when an account or feature is likely to be used in view of the totality of the characteristics of the account and usage history. The output of the machine learning model 242 thus indicates predicted next login times and/or predicted next feature usage times. These outputs establish respective priorities in the migration priority data 239 so that user accounts that are likely to be accessed in a near term are migrated first, and that features that are likely to be accessed are also migrated first, when fewer than all features are automatically migrated.

The migration rules 245 control the operation of the account migration application 221 to implement a migration from one platform to another. The migration rules 245 configure one or more of when migration is to begin, the pace of the migration with respect to the migration priorities established in the migration priority data 239, when the target application 236 is to be deployed, when the legacy application 233 is to be disabled, and/or other parameters relating to the migration.

The client device 206 is representative of a plurality of client devices 206 that may be in communication with the network 209. The client device 206 may comprise, for example, a processor-based system such as a computer system. Such a computer system may be embodied in the form of a desktop computer, a laptop computer, personal digital assistant, cellular telephone, smartphone, set-top box, music player, web pad, tablet computer system, game console, electronic book reader, smartwatch, head mounted display, voice interface device, or other device. The client device 206 may include a display 263. The display 263 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

In some embodiments, the client device 206 is configured to execute various applications such as the legacy application 233, the target application 236, and/or other applications. The legacy application 233 and the target application 236 may be executed in a client device 206, for example, to access network content served up by the computing environment 203 and/or other servers, thereby rendering a user interface 266 on the display 263.

The legacy application 233 may include a link 269 to the target application 236 so that when the legacy application 233 is executed, the legacy application 233 causes the target application 236 to be downloaded to the client device 206 and/or launched on the client device 206. Because the migration in some examples is performed as a gradual process based on user profiles, a first set of users that have been migrated receive the link 269 in the legacy application 233, while a second set of users that have not been migrated do not receive the link 269. It may be determined that the first set of users, based on their respective characteristics, are more likely to log in to the legacy application 233 and use features that depend on migration, while the second set of users, based on their respective characteristics, are less likely to log into the legacy application 233 and use the features that depend on migration. Further, a link 269 shows up later for some users in some implementations based on user activity. For example, when a user accesses some feature of the legacy application 233 for which migration becomes necessary, the legacy application 233 receives corresponding update data and then shows the link 269.

In one embodiment, the client device 206 stores application data 272 accessible to the legacy application 233 and/or the target application 236. For example, the legacy application 233 may make registration credentials available to the target application 236 from the application data 272.

Figure 3:
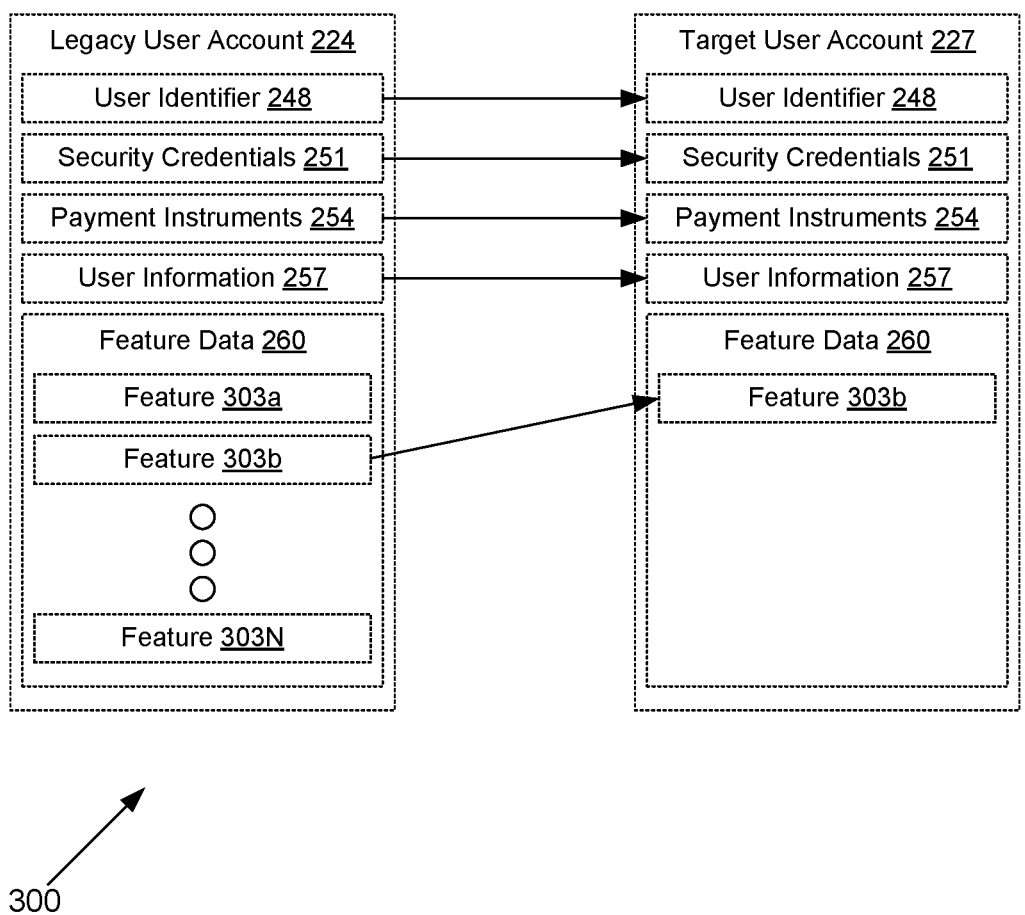
FIG. 3 is a diagram illustrating the migration process from a legacy user account to a target user account according to various embodiments of the present disclosure.

FIG. 3 shows a diagram 300 illustrating an example of a migration process from a legacy user account 224 to a target user account 227. To begin, the user identifier 248 is copied from the legacy user account 224 to the target user account 227. However, as the user identifier 248 should be unique, there is a possibility for a collision if a user has already created a target user account 227 with the same user identifier 248. In some cases, the existing target user account 227 is created by the same user, and the account migration application 221 provides an option to merge the legacy user account 224 with the existing target user account 227. Alternatively, the user may be given a chance to select a different user identifier 248, and one or more suggestions may be provided to the user based at least in part on the previous user identifier 248. In one scenario, the user is asked for permission to migrate the legacy user account 224 before migration occurs.

The security credentials 251 are imported from the legacy user account 224 to the target user account 227. In some cases, a verification may be performed on the security credentials 251 to ensure that they meet any security credential requirements established by the target user account 227. For example, the security credentials 251 for the target user account 227 may be required to be a password of a certain length and use a certain quantity of special characters. The legacy user account 224 may have had different requirements or no requirements. In some embodiments, the security credentials 251 are imported for initial use, and the user is then prompted to change the security credentials 251 and/or provide additional security credentials 251 (e.g., by configuring multi-factor authentication, answering additional knowledge-based questions, and so on). Where the security credentials 251 are in an encrypted or hashed format, the encrypted or hashed version may be transferred, or the user may be asked to provide the security credentials 251 so that they may be encrypted or hashed into a different format.

In one embodiment, one or more payment instruments 254 are imported automatically from the legacy user account 224 to the target user account 227. This may be performed in order to assure continuity with automatic payment arrangements. In some cases, only a subset of payment instruments 254 will be imported automatically, with the user being required to approve or confirm transfers of payment instruments 254. In some embodiments, all of the user information 257 may be directly imported from the legacy user account 224 to the target user account 227. In some cases, the user information 257 is transformed from one format to another.

In some embodiments, a subset or less than all of the various features 303 in the feature data 260 are imported from the legacy user account 224 to the target user account 227. In this example, features 303a, 303b . . . 303N are shown in the feature data 260 of the legacy user account 224, but only feature 303b is transferred to the feature data 260 of the target user account 227. In such a situation, the other non-transferred features 303a, 303N may be unsupported or deprecated under the target platform. Alternatively, the other non-transferred features 303a, 303N may be of a lower priority and only transferred on-demand or at a later scheduled time according to the priority order. In transferring the features 303, the account migration application 221 may apply transformations, conversions, or other types of processing. For example, where the feature 303 corresponds to a wish list, the items in the wish list may be converted from catalog information associated with the legacy platform to catalog information associated with the target platform, which may result in differences to price, availability, images, description, and so on. In some cases, items from the legacy catalog may not be available in the target catalog, while in other cases, an item from the legacy catalog may map to multiple possible items in the target catalog.

Figure 4:
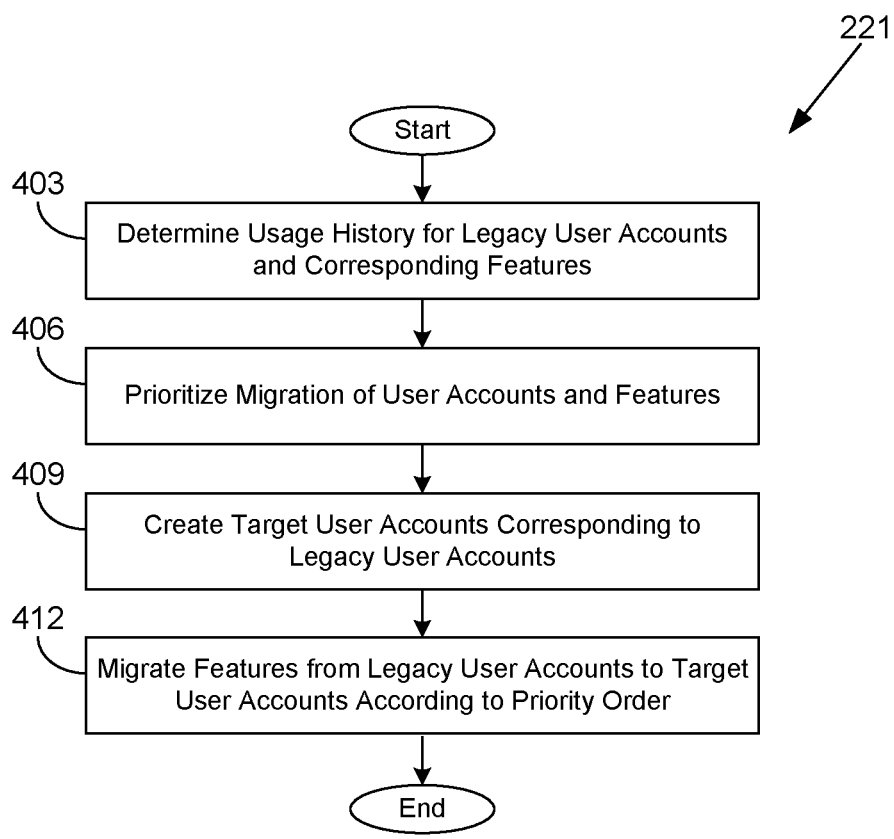
FIGS. 4-7 are flowcharts illustrating examples of functionality implemented as portions of an account migration application executed in a computing environment in the networked environment of FIG. 2 according to various embodiments of the present disclosure.

FIG. 4 shows a flowchart that provides one example of the operation of a portion of the account migration application 221 according to various embodiments. It is understood that the flowchart of FIG. 4 provides merely an example of the many different types of functional arrangements that may be employed to implement the operation of the portion of the account migration application 221 as described herein. As an alternative, the flowchart of FIG. 4 may be viewed as depicting an example of elements of a method implemented in the computing environment 203 (FIG. 2) according to one or more embodiments.

Beginning with box 403, the account migration application 221 determines a usage history for legacy user accounts 224 (FIG. 2) and their corresponding features 303 (FIG. 3) from the feature data 260 (FIG. 2). The usage history may then be stored as the account usage history data 230 (FIG. 2) in the data store 212 (FIG. 2). The usage history is used in training one or more machine learning models 242 (FIG. 2) for predicting future usage. For example, actual usage history is correlated with account characteristics in order to train the machine learning model 242 to predict future usage.

At box 406, the account migration application 221 prioritizes the migration of the legacy user accounts 224 and one or more features 303 based at least in part on the usage history. For example, the account migration application 221 may generate a priority order or schedule for the migration to occur. The priority order may take into consideration which users are most likely to login within a future time frame, thus prompting migration of the user's accounts, as well as which features 303 those users are predicted to use. The priority order may be stored in the migration priority data 239 (FIG. 2)

At box 409, the account migration application 221 creates target user accounts 227 (FIG. 2) corresponding to the legacy user accounts 224. In one implementation, user accounts that have not met a minimum usage threshold are excluded from the migration. Such an account may not meet the threshold based on length of time since last login (e.g., no login in the last six months) or a relatively low frequency of use (e.g., login last week, but only once every six months on average).

In some embodiments, there are different migration paths for a legacy user account 224 based at least in part on a geographic location or region associated with the legacy user account 224. As an example, the account migration application 221 refrains from migrating legacy user accounts 224 associated with a first geographic region but migrates legacy user accounts 224 associated with a second geographic region. As another example, the account migration application 221 migrates legacy user accounts 224 from different geographic regions to target user accounts 227 on different platforms.

At box 412, the account migration application 221 migrates features 303 from the legacy user accounts 224 to the target user accounts 227 according to the priority order.

In various situations, some features 303 may not be migrated, while other features 303 may be migrated over time according to the priority. Thereafter, the operation of the portion of the account migration application 221 ends.

Figure 5:
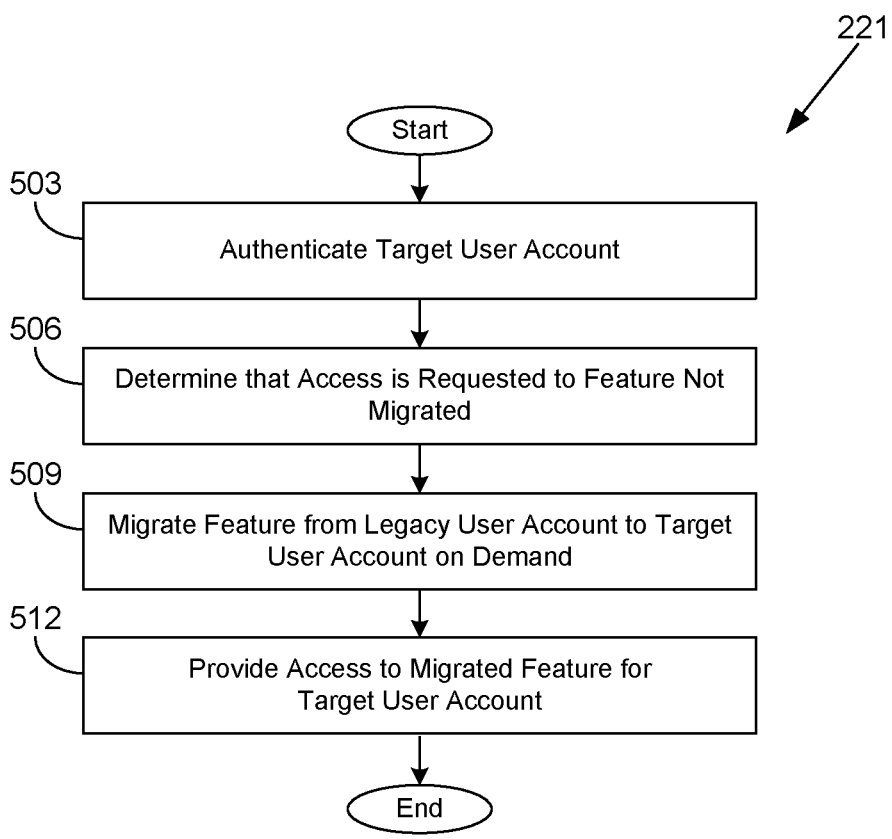

FIG. 5 shows a flowchart that provides one example of the operation of another portion of the account migration application 221 according to various embodiments. It is understood that the flowchart of FIG. 5 provides merely an example of the many different types of functional arrangements that may be employed to implement the operation of the portion of the account migration application 221 as described herein. As an alternative, the flowchart of FIG. 5 may be viewed as depicting an example of elements of a method implemented in the computing environment 203 (FIG. 2) according to one or more embodiments.

Beginning with box 503, the account migration application 221 determines that a client device 206 (FIG. 2) is authenticated for access to a target user account 227 (FIG. 2). For example, the user at the client device 206 may have provided appropriate security credentials 251 (FIG. 2) to confirm his or her identity to the target platform services 218 (FIG. 2). At box 506, the account migration application 221 determines that the client device 206 has requested access to a feature 303 (FIG. 3) that has not yet been migrated. For example, the feature 303 may have a relatively low priority and is scheduled for future migration, or the feature 303 may be migrated only upon requested access, or on-demand.

At box 509, the account migration application 221 migrates the feature 303 from the corresponding legacy user account 224 (FIG. 2) to the target user account 227 on demand. A user interface 266 (FIG. 2) is generated on the client device 206 to inform the user of the migration and to explain any delay in accessing the feature 303. At box 512, the account migration application 221 provides access to the migrated feature 303 for the target user account 227. Thereafter, the operation of the portion of the account migration application 221 ends.

Figure 6:
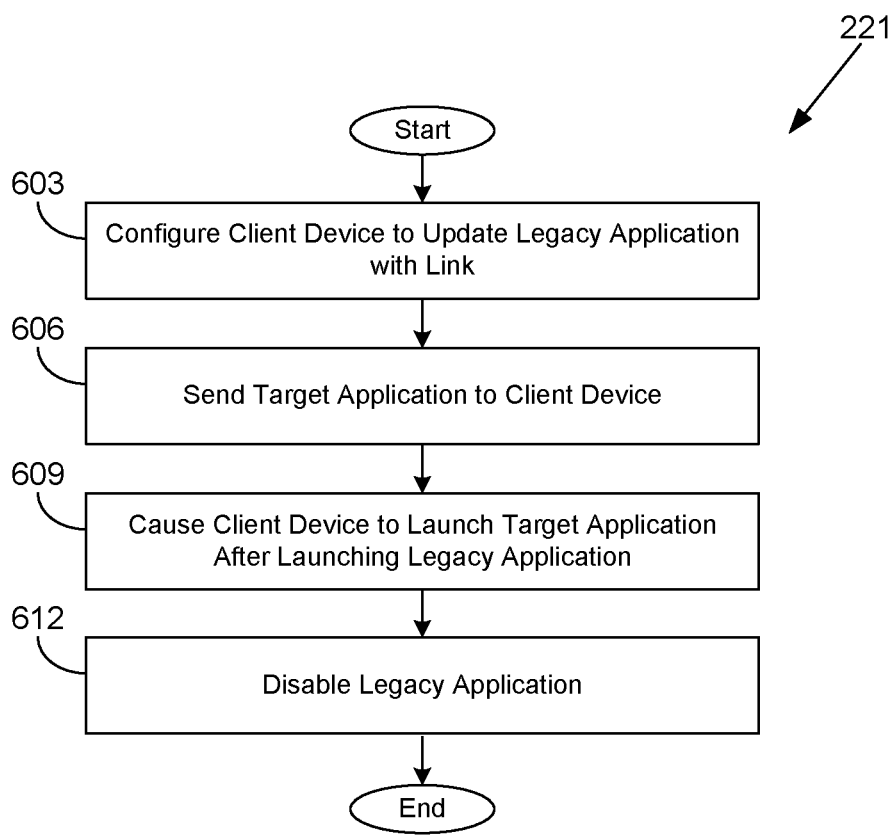

FIG. 6 shows a flowchart that provides one example of the operation of another portion of the account migration application 221 according to various embodiments. It is understood that the flowchart of FIG. 6 provides merely an example of the many different types of functional arrangements that may be employed to implement the operation of the portion of the account migration application 221 as described herein. As an alternative, the flowchart of FIG. 6 may be viewed as depicting an example of elements of a method implemented in the computing environment 203 (FIG. 2) according to one or more embodiments.

Beginning with box 603, the account migration application 221 configures a client device 206 (FIG. 2) to obtain an update to the legacy application 233 (FIG. 2) from the computing environment 203. This update includes a link 269 (FIG. 2) to the target application 236 (FIG. 2). Upon receipt of the update to the legacy application 233, the legacy application 233 causes the target application 236 to be obtained from the computing environment 203. The legacy application 233 can prompt the user to select a link 269, prompt the user to activate a control to select the link 269, or the legacy application 233 can select the link 269 automatically. In one embodiment, the legacy application 233 causes an application store program to be launched, where the target application 236 is preselected in the application store program.

At box 606, the account migration application 221 sends the target application 236 to the client device 206 via the network 209 (FIG. 2). At box 609, the account migration application 221 provides a control to the client device 206 associated with instructions that cause the client device 206 to launch the target application 236 after launching the legacy application 233. For example, the next time that the user launches the legacy application 233, a user interface 266 (FIG. 2) may be rendered that redirects the user to launch the target application 236.

At box 612, the account migration application 221 may disable the legacy application 233. This may occur by disabling the legacy platform services 215 (FIG. 2) in the computing environment 203, or the account migration application 221 may configure the legacy application 233 not to be operable, or always to redirect via the link 269 to the target application 236. Alternatively, the legacy application 233 may be permitted to continue operation alongside the target application 236. For example, the legacy platform may simply share certain user account information with the target platform (e.g., to enable the target platform to use a payment feature supported by the legacy platform), and the operations of both the legacy platform and the target platform continue post-migration. Thereafter, the operation of the portion of the account migration application 221 ends.

Figure 7:
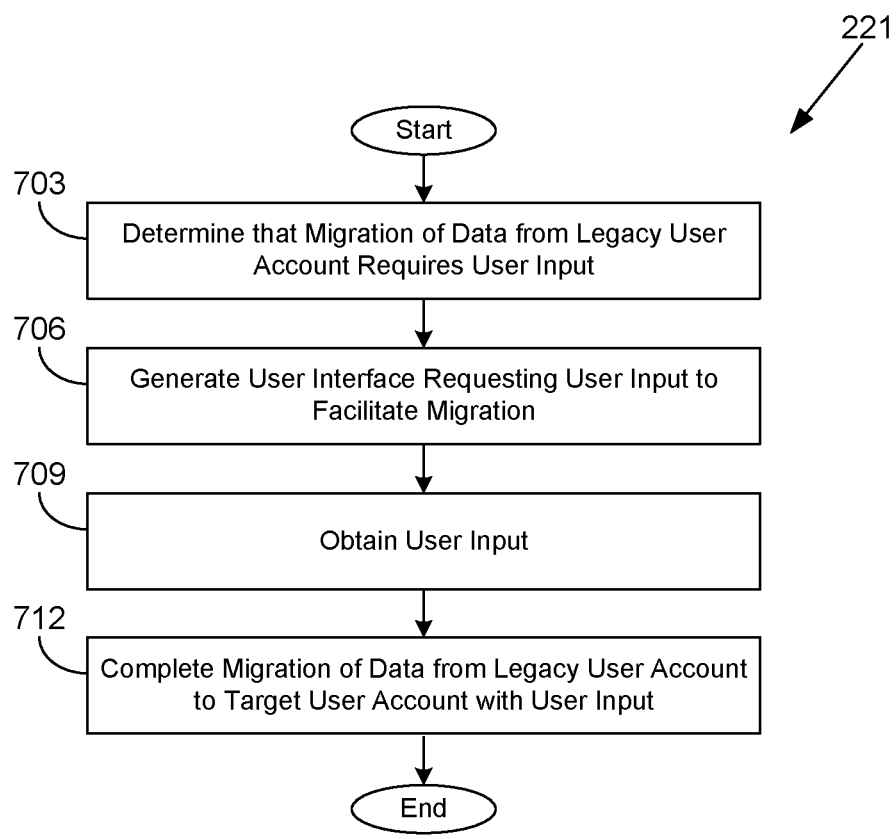

FIG. 7 shows a flowchart that provides one example of the operation of another portion of the account migration application 221 according to various embodiments. It is understood that the flowchart of FIG. 7 provides merely an example of the many different types of functional arrangements that may be employed to implement the operation of the portion of the account migration application 221 as described herein. As an alternative, the flowchart of FIG. 7 may be viewed as depicting an example of elements of a method implemented in the computing environment 203 (FIG. 2) according to one or more embodiments.

Beginning with box 703, the account migration application 221 determines that migration of data for a legacy user account 224 (FIG. 2) to a target user account 227 (FIG. 2) requires user input. For example, a user identifier 248 (FIG. 2) from the legacy user account 224 may be unavailable for use in the target user account 227, or the target user account 227 may correspond to a preexisting account of the user. As another example, the payment instrument 254 (FIG. 2) may be expired and may need to be updated in order for the migration to complete.

At box 706, the account migration application 221 generates a user interface 266 (FIG. 2) on the client device 206 (FIG. 2) requesting user input to facilitate the migration. At box 709, the account migration application 221 obtains the user input from the client device 206 via the network 209 (FIG. 2). At box 712, the account migration application 221 completes the migration of data from the legacy user account 224 to the target user account 227 using the user input that has been obtained. Thereafter, the operation of the portion of the account migration application 221 ends.

Figure 8:
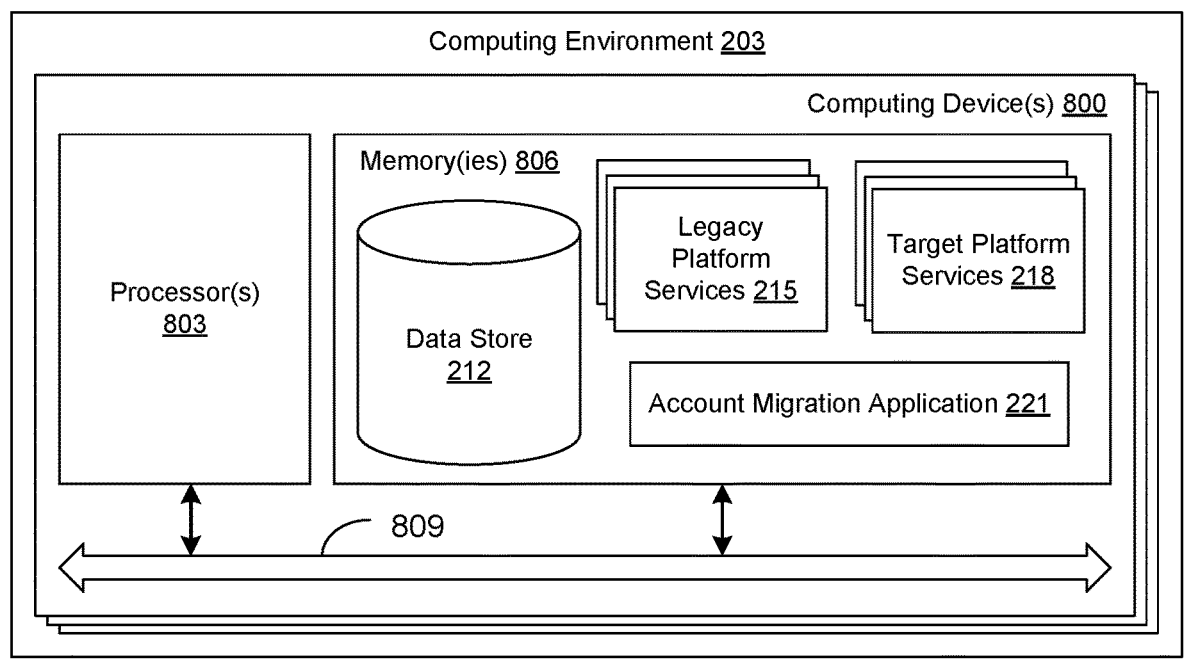
FIG. 8 is a schematic block diagram that provides one example illustration of a computing environment employed in the networked environment of FIG. 2 according to various embodiments of the present disclosure.

FIG. 8 shows a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In one embodiment, the memory 806 stores instructions that are executable by the processor 803 to implement the legacy platform services 215, the target platform services 218, the account migration application 221, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the legacy platform services 215, the target platform services 218, the account migration application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-7 show the functionality and operation of an implementation of portions of the account migration application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the legacy platform services 215, the target platform services 218, and the account migration application 221, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the legacy platform services 215, the target platform services 218, and the account migration application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program includes instructions that cause the at least one computing device to at least:
   determine a corresponding usage history for at least one feature of a first platform for individual first user accounts of a plurality of first user accounts of the first platform;
   create a corresponding second user account for a second platform for the individual first user accounts of the plurality of first user accounts;
   determine a next expected usage time for the at least one feature based at least in part on the corresponding usage history for the at least one feature and a machine learning model that uses training data, the machine learning model creating the training data by using a cluster algorithm and using a plurality of different next expected usage times for a plurality of other user accounts, wherein the next expected usage time is a prediction of a time frame for the at least one feature being accessed at the first platform;

determine a placement for the at least one feature in a migration schedule based at least in part on the next expected usage time, wherein the migration schedule comprises a subsequent time frame for migrating the at least one feature and a respective user account among the plurality of first user accounts to the second platform;

migrate user data corresponding to the at least one feature from one or more of the plurality of first user accounts to the corresponding second user account based at least in part on the subsequent time frame indicated by the migration schedule for the at least one feature;

transmit to a respective client device of a plurality of client devices an update to a first application used to access the first platform, wherein the update comprises a hyperlink that is configured to direct the respective client device to download a second application used to access the second platform, wherein the hyperlink is configured to be displayed by the first application;

provide the respective client device with a control associated with executable instructions that cause the second application to be launched for access to the corresponding second user account after the first application is launched; and disable the first application on the respective client device after the second application has been launched.

2. The non-transitory computer-readable medium of claim 1, further including instructions that cause the at least one computing device to at least:

determine that access to the at least one feature has been requested through the second application but the user data corresponding to the at least one feature has not been migrated for a particular first user account; and migrate the user data corresponding to the at least one feature for the particular first user account to a particular second user account in response to determining that the access to the at least one feature has been requested.

3. A method, comprising:

configuring, by at least one computing device, a client device to obtain an update to a first application, wherein the update comprises a hyperlink that directs the client device to obtain a second application, wherein the hyperlink is configured to be displayed by the first application;

determining, by the at least one computing device, a next expected login time for a first user account on a first platform associated with the first application based at least in part on a frequency of logins for the first user account and a machine learning model that has been trained with a plurality of frequency logins by a plurality of other user accounts;

determining, by the at least one computing device, a migration schedule based at least in part on the next expected login time, wherein the migration schedule comprises a subsequent time frame for migrating the first user account to a second platform associated with the second application;

migrating, by the at least one computing device, the first user account on the first platform associated with the first application to a second user account on the second platform based at least in part on the subsequent time frame indicated by the migration schedule for the first user account;

providing, by the at least one computing device, the client device with a control associated with instructions that cause the second application to be launched for access to the second user account after the first application is launched; and disabling, by the at least one computing device, the first application on the client device after the second application has been launched.

4. The method of claim 3, further comprising:

determining, by the at least one computing device, the migration schedule based at least in part on a relative usage of the first user account among a plurality of first user accounts.

5. The method of claim 4, further comprising determining, by the at least one computing device, the relative usage of the first user account based at least in part on a history of one or more logins of the first user account.

6. The method of claim 3, wherein migrating the first user account further comprises:

determining, by the at least one computing device, a geographic location associated with the first user account; and identifying, by the at least one computing device, the second platform from a plurality of second platforms based at least in part on the geographic location.

7. The method of claim 3, wherein migrating the first user account further comprises transferring, by the at least one computing device, data encoding a payment instrument from the first user account to the second user account.

8. The method of claim 3, wherein migrating the first user account further comprises prioritizing a migration of at least one feature of the first user account to the second user account based at least in part on a relative usage of the at least one feature among a plurality of features of the first user account.

9. The method of claim 3, wherein migrating the first user account further comprises:

determining, by the at least one computing device, at least one respective feature of the first user account that does not meet a minimum usage threshold; and refraining, by the at least one computing device, from automatically migrating the at least one respective feature of the first user account to the second user account.

10. The method of claim 9, further comprising:

detecting, by the at least one computing device, a user request to access the at least one respective feature via the second user account; and automatically migrating, by the at least one computing device, the at least one respective feature of the first user account to the second user account in response to detecting the user request.

11. The method of claim 3, wherein migrating the first user account further comprises:

determining, by the at least one computing device, an account identifier and a security credential corresponding to the first user account; and creating, by the at least one computing device, the second user account on the second platform having the account identifier and the security credential.

12. The method of claim 11, wherein migrating the first user account further comprises determining, by the at least one computing device, that the account identifier is available on the second platform before creating the second user account.

13. A system, comprising:

at least one computing device; and an account migration application executable in the at least one computing device, wherein when executed the account migration application causes the at least one computing device to at least:
- determine a corresponding usage history for at least one feature of a first platform for individual first user accounts of a plurality of first user accounts of the first platform;
- create a corresponding second user account for a second platform for the individual first user accounts of the plurality of first user accounts;
- determine a next expected usage time for the at least one feature based at least in part on the corresponding usage history for the at least one feature and a machine learning model that has been trained with usage history data for a plurality of other user accounts;
- determine a placement for the at least one feature in a migration schedule based at least in part on the next expected usage time, wherein the migration schedule comprises a subsequent time frame for migrating the at least one feature and a respective user account to the second platform; and
- migrate user data corresponding to the at least one feature from the plurality of first user accounts to the corresponding second user account based at least in part on the subsequent time frame indicated by the migration schedule for the at least one feature,
- configure a first application on a plurality of client devices associated with the plurality of first user accounts to obtain a second application for use in accessing the corresponding second user account; and
- disable the first application on the plurality of client devices after the second application has been obtained.

14. The system of claim 13, wherein when executed the account migration application further causes the at least one computing device to at least refrain from migrating the user data corresponding to the at least one feature for a particular first user account that does not meet a minimum usage threshold according to the corresponding usage history.

15. The system of claim 13, wherein the migration of the user data corresponding to the at least one feature is prioritized according to a relative priority determined from the corresponding usage history.

16. The system of claim 13, wherein when executed the account migration application further causes the at least one computing device to at least:
- determine a respective user identifier associated with each first user account of the plurality of first user accounts;
- determine that the respective user identifier is available for the second platform; and
- configure the corresponding second user account to use the respective user identifier.

17. The system of claim 13, wherein when executed the account migration application further causes the at least one computing device to at least:
- determine that access to the at least one feature is requested for a particular second user account for which the at least one feature has not been migrated; and
- migrate the at least one feature from the user data from a corresponding first user account to the particular second user account in response to determining that the access to the at least one feature is requested.

18. The system of claim 13, wherein the machine learning model uses a clustering algorithm to determine a cluster of user account characteristics associated with a plurality of respective user accounts that have a plurality of next expected usage times.

* * * * *